Apr. 24, 1923.  
H. DALITZ  
1,452,494  
SINK STRAINER  
Filed Nov. 6, 1922
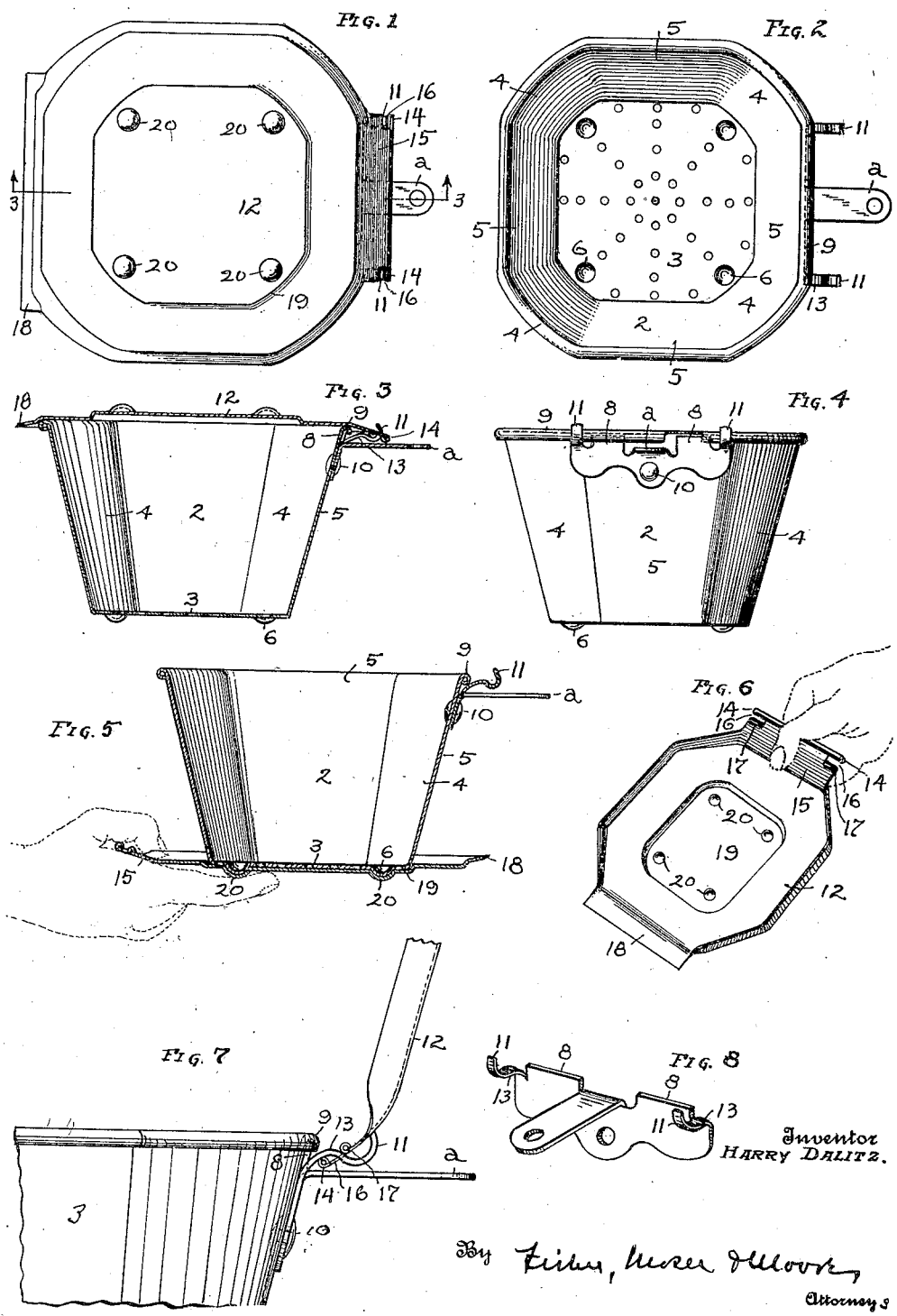

Patented Apr. 24, 1923.

1,452,494

UNITED STATES PATENT OFFICE.

HARRY DALITZ, OF CLEVELAND, OHIO.

SINK STRAINER.

Application filed November 6, 1922. Serial No. 599,225.

*To all whom it may concern:*

Be it known that I, HARRY DALITZ, a citizen of the United States, residing at Cleveland, in the county of Cuyahoga and State of Ohio, have invented certain new and useful Improvements in a Sink Strainer, of which the following is a specification.

My invention relates to an improvement in a sink strainer, and the object of the improvement is to provide a sink strainer with a lid which may be tilted and held in a stationary open position or quickly and conveniently detached to serve as a tray for transporting the strainer from place to place and also used as a sink scraper or cleaner, all as hereinafter shown and described and more particularly pointed out in the claims.

In the annexed drawing, Fig. 1 is a plan view of the strainer with the lid in place thereon. Fig. 2 is a plan view of the strainer without the lid. Fig. 3 is a vertical section on line 3—3 of Fig. 1. Fig. 4 is an end elevation of the strainer with the lid removed. Fig. 5 is a sectional view of the strainer seated within the inverted lid. Fig. 6 is a perspective view of the lid used as a scraper or cleaner. Fig. 7 is an enlarged side view of the hinge portion of the strainer with the lid tilted in open rest position. Fig. 8 is a perspective of the hinge plate.

The device consists of a vessel 2 having a perforated bottom 3, and to permit this body to be pressed out of sheet metal it is made octagonal and tapered from top to bottom, each diagonal corner portion 4 being slightly rounded to facilitate its manufacture and to permit the vessel to be fitted closely within corners and the other sides 5 being flat, especially the rear side to permit it to be seated against a flat surface. The bottom of the strainer is provided with a series of downwardly-projecting protuberances 6 opposite each corner which serve to support the strainer in a slightly elevated position upon a flat surface. The upper edge of the strainer body is curled outwardly, and a flat metal plate 7 having a pair of vertical tongues 8—8 at its upper edge is placed flatwise against the rear flat side of the body with said tongues projected into the curled bead or rim portion 9 of the body. A single rivet 10 fastens plate 7 in position and the tongues prevent the plate from lateral displacement and a turning movement. Two hook-shaped projections 11—11 extend rearwardly and upwardly from the end portions of plate 7 to provide hinge and stop members for a lid or cover 12. The hook projections 11 extend to a higher plane than the beaded rim portion of the body and a reversely-curved portion 13 is formed at the base end of the projections, see Fig. 7, where the lid 12 is shown as resting in an upright inclined position against the curved extremity of projection 11, and the pivot member 14 of the lid bears against the curved base portion 13. Plate 7 has an arm *a* bent rearwardly at right angles intermediate the tongues and the free end of this arm has an opening to permit the strainer to be suspended upon a nail or hook.

The pivot members 14 are formed integral with the lid by providing a wide lip or extension 15 at one edge of the lid and slotting the stock at each side edge and then curling the straight end edge into a round roll of relatively small diameter. The inner edge of each slot 16 opposite the pivot or hinge members 14 is also curled into a roll 17, thus facilitating the entrance of the hooks 11 into the slots when the lid is placed in position upon the strainer body, and also promoting turning movements of the lid into open and closed positions. That is to say, the lid may be tilted on its pivot members 14 to give access to the strainer, or the lid may be bodily removed with dispatch and ease. When detached the lid may be washed and cleaned separately from the strainer, and this lid is also provided with a sharp projecting straight edge and scraping lip 18 on the opposite side of extension 15 having the pivot projections. Lip 18 also affords a means of engaging the cover by the fingers to tilt the cover, and the extension 15 affords a hand grip, as shown in Fig. 6, whereby the lid may be used as a scraper to clean or gather up the garbage or other matter deposited on the bottom of the kitchen sink or on the drain board of the sink, using lip 18 as a scraping edge. When the lid is held in the hand in this way the lid may be used to gather up and convey the scrapings to the uncovered receptacle, and it may also be placed immediately beneath the receptacle as it hangs upon a hook or nail to lift the receptacle free and to carry it away to a garbage depository without directly grasping the strainer body, see Fig. 5. In carrying the strainer in this way it frequently happens that a large quantity of water may still be present within the receptacle; therefore to prevent any liquid dripping through the perforated bottom and flooding the lid or tray and escaping to the floor while the receptacle is being carried, the lid is provided at its center with a flat octagonal or square depression 19 and a series of concavo-convex depressions 20 to permit the perforated bottom of the receptacle to rest flat and snugly upon the lid. The octagonal bottom of the receptacle is of substantially the same size as the octagonal depression 19 so that the receptacle is prevented from slipping laterally thereon and the depressions 20 coincide with the protuberances on the bottom of the receptacle to permit such protuberances to be socketed within the depressions, thereby further promoting stability of the vessel when on the tray. Any number of these protuberances and depressions may be used and the device may be made of aluminum, tin or enameled material. As shown herein, the strainer consists of three metal stampings,— the body, the lid, and the hinge plate, which are inexpensive to produce, but when assembled or used together, the device embodies all the features of utility as hereinbefore explained.

What I claim, is:

1. A sink strainer or garbage receptacle having a detachable lid, the bottom of said receptacle being perforated and of smaller area than the upper portion thereof, and said lid being relatively larger than the enlarged upper portion of said receptacle and slightly dished to seat in an inverted position thereon and having a central depression corresponding in size and shape to said bottom and adapted to rest said bottom in a stable seating position.

2. A sink strainer or garbage receptacle having a perforated bottom provided with downwardly projecting protuberances, and a lid detachably connected with the upper end of said receptacle having depressions in its base coinciding with and adapted to receive said protuberances and permitting said bottom to rest flat in tight seating position upon said lid when the latter is detached and used as a transporting tray for said receptacle.

3. A sink strainer or garbage receptacle and a lid having a laterally extending portion and freely detachable hinge connections at one edge, said lid having a scraping lip opposite said edge adapting the lid to be used as a sink scraper when the laterally extending portion is gripped by the hand.

4. A sink strainer or garbage receptacle having a perforated bottom, and a detachable lid for said receptacle having a handhold extension at one side and a scraping lip opposite thereto, said extension having hinge members adapted to connect with said receptacle.

5. A sink strainer or garbage receptacle having a hinge plate affixed thereto and a lid having oppositely extending hinge members permitting said lid to be tilted and also freely removed and replaced in connection with said hinge plate, said lid having a central depression therein adapted to nest the bottom of said receptacle and provided with a scraping lip at one side and a lateral handhold extension at its opposite side.

6. A sink strainer or garbage receptacle having a perforated bottom, a hinge plate permanently affixed to one side of said receptacle adjacent its upper edge, and a separate lid for said receptacle having pivot members detachably engaged with said hinge plate.

7. A sink strainer or garbage receptacle having a perforated bottom and a curled upper edge, a hinge plate extending beneath said edge and affixed to the side of said receptacle, and a lid for said receptacle having a freely detachable hinge connection with said hinge plate.

8. A sink strainer or garbage receptacle having a perforated bottom and a curled upper edge, a plate having tongues extending beneath said curled edge and an arm extending to one side thereof and a pair of hook portions, and a lid having pivot members detachably connected with said hook portions.

9. A sink strainer or garbage receptacle having a tapering body of octagonal form and a perforated bottom, and a lid having a freely-detachable hinge connection at one side of said body and a depression in its middle area adapted to nest and seat said bottom.

In testimony whereof, I affix my signature hereto.

HARRY DALITZ.